(12) United States Patent
Suenaga

(10) Patent No.: US 8,433,949 B2
(45) Date of Patent: Apr. 30, 2013

(54) DISK ARRAY APPARATUS AND PHYSICAL DISK RESTORATION METHOD

(75) Inventor: Masaya Suenaga, Tokyo (JP)

(73) Assignee: NEC Corporation, Tokyo (JP)

( * ) Notice: Subject to any disclaimer, the term of this patent is extended or adjusted under 35 U.S.C. 154(b) by 352 days.

(21) Appl. No.: 12/840,970

(22) Filed: Jul. 21, 2010

(65) Prior Publication Data
US 2011/0022889 A1    Jan. 27, 2011

(30) Foreign Application Priority Data
Jul. 24, 2009   (JP) .................................. 2009-173656

(51) Int. Cl.
*G06F 11/00*    (2006.01)
(52) U.S. Cl.
USPC ............ 714/6.32; 714/6.1; 714/6.22; 714/6.3
(58) Field of Classification Search .................... 714/6.1, 714/6.22, 6.3, 6.32
See application file for complete search history.

(56) References Cited

U.S. PATENT DOCUMENTS

| | | | | |
|---|---|---|---|---|
| 5,859,960 A * | 1/1999 | Kurihara et al. | ............ | 714/6.32 |
| 7,024,586 B2 * | 4/2006 | Kleiman et al. | ............ | 714/6.32 |
| 7,047,380 B2 * | 5/2006 | Tormasov et al. | ............ | 711/162 |
| 7,353,355 B1 * | 4/2008 | Tormasov et al. | ............ | 711/165 |
| 7,366,859 B2 * | 4/2008 | Per et al. | ....................... | 711/162 |
| 7,475,282 B2 * | 1/2009 | Tormasov et al. | ............ | 714/6.3 |
| 7,490,270 B2 * | 2/2009 | Cherian | .......................... | 714/42 |
| 2003/0120674 A1 * | 6/2003 | Morita et al. | .................. | 707/100 |
| 2003/0237019 A1 * | 12/2003 | Kleiman et al. | ............ | 714/6 |
| 2005/0097389 A1 * | 5/2005 | Tanaka et al. | ..................... | 714/5 |
| 2006/0112302 A1 * | 5/2006 | Cherian | ........................ | 714/6 |

FOREIGN PATENT DOCUMENTS

| | | |
|---|---|---|
| JP | 11-24849 A | 1/1999 |
| JP | 2002222063 A | 8/2002 |
| JP | 2003241904 A | 8/2003 |
| JP | 2004199202 A | 7/2004 |
| JP | 2005107839 A | 4/2005 |
| JP | 2006285807 A | 10/2006 |
| JP | 2007058286 A | 3/2007 |
| JP | 2008146574 A | 6/2008 |

OTHER PUBLICATIONS

Japanese Office Action for JP2009-173656 dated May 24, 2011.

* cited by examiner

*Primary Examiner* — Joshua P Lottich

(57) ABSTRACT

The invention provides a disk array apparatus and a physical disk restoration method for managing a used area and an unused area of a faulty physical disk and shortening the time required for the physical disk to become usable by an external unit. The disk array apparatus includes: a unit for determining whether block areas of the physical disk are used areas or unused areas; a unit for recovering data in relation to block areas determined to be used areas and writing the recovered data to block areas of a spare disk corresponding to the used areas; a unit for transmitting a notification that the physical disk is usable to a host apparatus when data recovery is completed; and a unit for writing zero data to block areas of the spare disk corresponding to block areas determined to be unused areas after transmitting the notification.

9 Claims, 8 Drawing Sheets

| | Block#0 | Block#1 | ··· | Block#L | Block#L+1 | ··· | Block#N |
|---|---|---|---|---|---|---|---|
| PD#0 | USED | USED | | USED | USED | | UNUSED |
| PD#1 | | | | | | | |
| ⋮ | | | | | | | |
| PD#L | | | | | | | |
| PD#L+1 | | | | | | | |
| ⋮ | | | | | | | |
| PD#N | | | | | | | |

|  | LDN#1 | ... | LDN#N |
|---|---|---|---|
| PD#0 | YYYYYYYY | | YYYYYYYY |
| PD#1 | YYYYYYYY | | YYYYYYYY |
| ⋮ | | | |
| PD#N | YYYYYYYY | | YYYYYYYY |

41

DISK ARRAY APPARATUS AND PHYSICAL DISK RESTORATION METHOD

CROSS-REFERENCES

This application is based upon and claims the benefit of priority from Japanese patent application No. 2009-173656, filed on Jul. 24, 2009, the disclosure of which is incorporated herein in its entirety by reference.

TECHNICAL FIELD

The present invention relates to a physical disk restoration technique employed in a disk array apparatus having a physical disk.

BACKGROUND ART

A disk array apparatus is constituted by a control unit for controlling data input/output to/from the disk array apparatus and a disk formed from a plurality of physical disks for storing the data. Further, the disk array apparatus manages the plurality of physical disks using a RAID (Redundant Array of Independent/Inexpensive Disks) system.

In this type of disk array apparatus, when a fault occurs in one of the plurality of physical disks, the faulty physical disk can be restored using the remaining physical disks. The time required for the physical disk to become usable by an external unit increases in proportion to a storage capacity of the physical disk, and therefore a technique for shortening the time required for the physical disk to become usable is much needed. In recent years, various methods of shortening the time required for a faulty physical disk to become usable have been proposed.

When a fault occurs in a physical disk, as described above, the disk array apparatus cannot determine an unused area (free area) of the physical disk, and therefore a large amount of time is required for the physical disk to become usable by an external unit. Further, when a problem occurs in a restoration source physical disk during restoration of the physical disk, a media error occurs, and in this case, certain data cannot be read from the restoration source physical disk. As a result, the disk array apparatus cannot determine whether the unreadable area is a used area or an unused area, and must therefore reconstruct the area.

Meanwhile, in the proposed related art, data recovery is performed in relation to the used area of the faulty physical disk, but the unused area of the faulty physical disk is not mentioned in detail.

Patent document 1: Japanese Unexamined Patent Publication No. 2002-222063.
Patent document 2: Japanese Unexamined Patent Publication No. H11-24849.

SUMMARY

An exemplary object of the invention is to proposes a disk array apparatus and a physical disk restoration method for managing a used area and an unused area of a faulty physical disk and shortening the time required for the physical disk to become usable by an external unit.

An exemplary aspect of the invention is to solve the problems described above, a disk array apparatus according to the present invention includes: a plurality of physical disks; at least one spare disk; a managing unit for managing a usage condition of a plurality of block areas formed by dividing respective storage areas of the physical disks and the spare disk; a unit for determining, when a fault occurs in a physical disk, whether the block areas of the physical disk are used areas or unused areas on the basis of the usage condition; a unit for recovering data in relation to block areas determined to be used areas and writing the recovered data to block areas of the spare disk corresponding to the used areas; a unit for setting that the physical disk is usable when data recovery is completed in relation to all of the block areas determined to be used areas; and a unit for writing zero data to block areas of the spare disk corresponding to block areas determined to be unused areas after transmitting a notification.

Further, an exemplary aspect of the invention is a physical disk restoration method employed in a disk array apparatus having a plurality of physical disks and at least one spare disk, wherein the disk array apparatus executes: managing a usage condition of a plurality of block areas formed by dividing respective storage areas of the physical disks and the spare disk; determining, when a fault occurs in a physical disk, whether the block areas of the physical disk are used areas or unused areas on the basis of the usage condition; recovering data in relation to block areas determined to be used areas and writing the recovered data to block areas of the spare disk corresponding to the used areas; setting that the physical disk is usable when data recovery is completed in relation to all of the block areas determined to be used areas; and writing zero data to block areas of the spare disk corresponding to block areas determined to be unused areas after transmitting a notification.

BRIEF DESCRIPTION OF THE DRAWINGS

FIG. 6 is a table showing an LBA management table 41 for managing the logical disk LDN of FIG. 5;

EXEMPLARY EMBODIMENT

Figure 1:
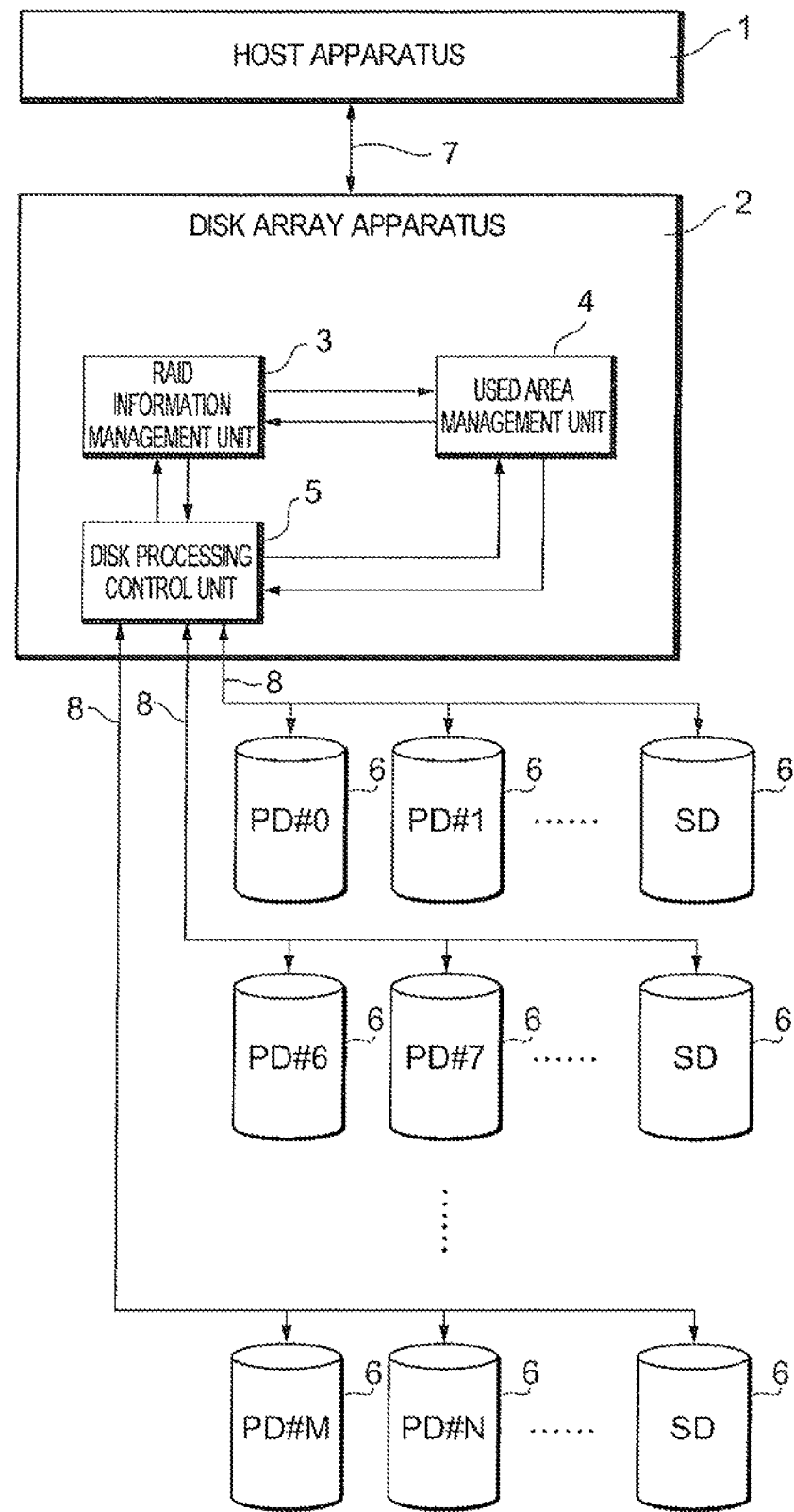
FIG. 1 is a block diagram showing a system 10 according to the present invention.
Figure 2:
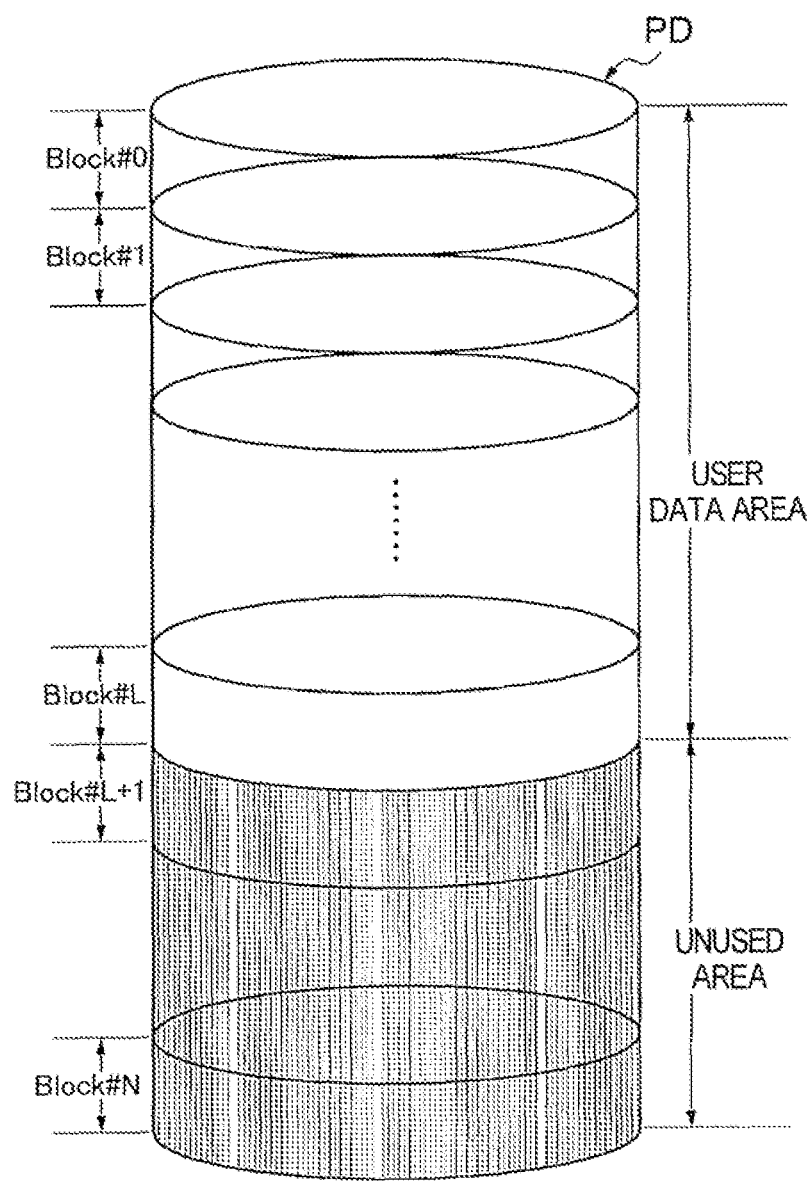
FIG. 2 is a conceptual diagram illustrating a physical disk PD and blocks.

An embodiment of the present invention will be described below with reference to the drawings. Note that in the drawings, identical reference symbols have been allocated to identical elements and duplicate description thereof has been omitted. Further, the following embodiment is an example for illustrating the present invention, and the present invention is not limited to this embodiment alone. Moreover, the present invention may be subjected to various amendments as long as such amendments do not depart from the spirit thereof.

(1) System Configuration

FIG. 1 is a block diagram showing a configuration of a disk array system 10 according to this embodiment. In this system 10, a host apparatus 1 is connected to a disk array apparatus 2 via a first network 7, and the disk array apparatus 2 is connected to a plurality of disks 6 (physical disks PD and spare disks SD) via a second network 8.

The host apparatus 1 is a computer apparatus including information processing resources such as a CPU and a memory, and is constituted by a personal computer, a workstation, a main frame, or similar, for example. Further, the host apparatus 1 includes an information input device (not shown) such as a keyboard or a switch, and an information output device (not shown) such as a monitor display or a speaker.

The first network 7 and the second network 8 are constituted by a SAN (Storage Area Network), a LAN (Local Area Network), the Internet, a public line, a private line, or similar, for example. For example, when the network is a SAN, communication is performed in accordance with a fiber channel protocol, and when the network is a LAN, communication is performed in accordance with a TCP/IP protocol. In this embodiment, a SAN is used as the first network 7 connecting the host apparatus 1 to the disk array apparatus 2, and any of an FC (Fiber Channel), an SAS (Serial Attached SCSI), and a SATA (Serial ATA) is used as the second network 8.

The disk array apparatus 2 includes a RAID information management unit 3, a used area management unit 4, and a disk processing control unit 5 for managing the plurality of physical disks PD (PD #0, . . . , PD #N) using a RAID system.

According to this embodiment, a single virtual storage area formed by grouping the physical disks PD or grouping divided storage areas obtained by dividing a storage area of a single physical disk PD into a plurality of areas is defined as a logical disk LDN (LDN #1, . . . , LDN #N). Accordingly, a plurality of logical disks LDN is defined from the plurality of physical disks PD. Further, each logical disk LDN is formed with sectors (divided storage areas) obtained by dividing a storage area of the logical disk LDN. All of the sectors are accessible, and an LBA (Logical Block Address) serving as a serial number is allocated to each sector.

Thus, logical disks LDN having predetermined RAID levels are formed from the plurality of physical disks PD. A physical disk PD not formed with a logical disk LDN is set as a spare disk SD (reserve disk). For example, on RAID level 5, a total of five physical disks PD including four physical disks and a parity disk (not shown) constitute a single RAID 5 group, and at least one spare disk SD is provided in addition to the physical disks PD belonging to the RAID group.

The RAID information management unit 3 monitors a use/non-use condition of the physical disks PD, a normal/abnormal condition of the physical disks PD, and so on, and issues a restoration instruction when a fault occurs in a physical disk PD.

Further, the RAID information management unit 3 includes an association table (not shown) for managing associations between the physical disks PD and the logical disks LDN. The association table is used to manage RAID information such as RAID groups to which the physical disks PD belong, RAID levels (levels 1 to 6), logical disks LDN constituting identical RAID groups, and the LBAs of the logical disks LDN corresponding to the sector numbers of the physical disks PD belonging to the RAID groups.

The used area management unit 4 manages the usage condition of the respective storage areas of the physical disks PD, and includes a management table 40.

Figure 3:
FIG. 3 is a table showing a management table 40 for managing the physical disk PD of FIG. 2.

As shown in FIG. 3, the management table 40 is constituted by a physical disk number column and columns corresponding to internal blocks of the respective physical disks PD, and is used to manage the usage condition of block areas Block #0, . . . , Block #N. Here, the block areas Block #0, . . . , Block #N are divided storage areas obtained by dividing the storage area of a single physical disk PD in predetermined storage capacity units such as 10 MB, for example. Further, the usage condition of the block areas Block #0, . . . , Block #N indicates whether or not data are written in the block areas Block #0, . . . , Block #N of the corresponding physical disk PD. A block area in which data are written is defined as a used area (user data area), and a block area in which data are not written is defined as an unused area. Note that the management table 40 may also be used to manage the usage condition of block areas Block #0, . . . , Block #N in the spare disk SD and associations between the block areas Block #0, . . . , Block #N of the spare disk SD and the block areas Block #0, . . . , Block #N of the physical disks PD.

The disk processing control unit 5 controls data input/output between the disk array apparatus 2 and the physical disks PD. Data input/output is performed by specifying a unique number of the physical disk PD and a number of the block area Block #0, . . . , Block #N of the physical disk PD. Note that data input/output between the disk array apparatus 2 and the logical disks LDN may also be controlled. A unique identifier LUN (Logical Block Number) is allocated to each logical disk LDN, and therefore data input/output is performed by specifying an address combining the unique identifier and the LBA (Logical Block Address) of the logical disk LDN.

(2) Restoration Method for Physical Disk PD

Figure 4:
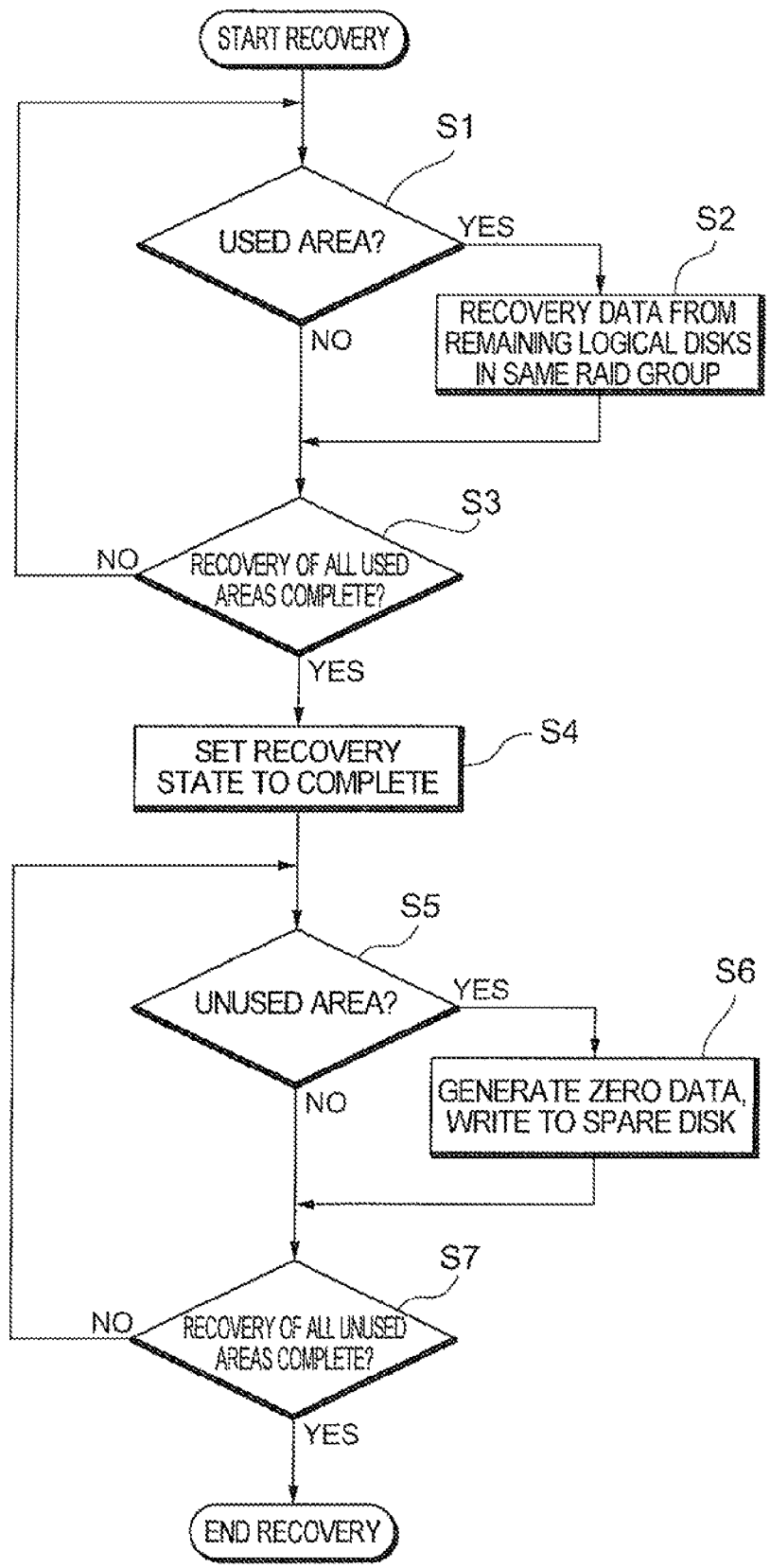
FIG. 4 is a flowchart used to recover a faulty physical disk PD.

Restoration processing, which is performed by the system 10 configured as described above when a fault occurs in a physical disk PD having a predetermined RAID level in order to restore the faulty physical disk PD, will be described using a flowchart in FIG. 4.

Here, restoration means setting the spare disk SD in the condition of the physical disk PD prior to occurrence of the fault, and includes recovery of both the used area and the unused area of the faulty physical disk PD. More specifically, restoration refers to a state achieved when the disk array apparatus 2 completes the processing of steps S1 to S7, to be described below. Note that a restoration program for executing the flowchart of FIG. 4 is stored in the memory (not shown) of the disk array apparatus 2, and when the RAID information management unit 3 detects a fault in a physical disk PD, the restoration program is read from the memory and executed.

When a fault occurs in a predetermined physical disk PD, the RAID information management unit 3 detects the faulty physical disk PD via the disk processing control unit 5 and begins restoration processing on the spare disk SD.

After detecting the faulty physical disk PD and specifying the physical disk PD by its unique number, the RAID information management unit 3 determines whether the block areas Block #0, . . . , Block #N of the specified physical disk PD are used areas (user data areas) or unused areas (S1). More specifically, the RAID information management unit 3 accesses the used area management unit 4 and determines whether or not the block areas Block #0, . . . , Block #N are used areas by referring to the management table 40. Further, the RAID information management unit 3 selects the spare disk SD to be used in the current restoration processing. Note that when the spare disks SD are managed on the management table 40, the RAID information management unit 3 selects the spare disk SD by referring to the management table 40.

Having determined that a specified block area is a used area (S1: YES), the RAID information management unit 3 refers to the association table to specify other physical disks PD of the RAID group to which the faulty physical disk PD belongs. The RAID information management unit 3 then recovers the data written in the used area of the faulty physical disk PD using the specified other physical disks PD, and transfers the recovered data to the spare disk SD via the disk processing control unit 5 such that the recovered data are gradually written thereto (S2). At this time, the RAID information management unit 3 records information relating to the data transferred to the spare disk SD from the faulty physical disk PD in the association table and the management table 40, whereby the information in the respective tables is updated.

Having recovered all of the data stored in the used area, the RAID information management unit 3 determines whether or not all of the recovered data have been written to the spare disk SD (S3). Note that the RAID information management unit 3 performs the processing of the step S3 even after determining that the specified block area is an unused area (S1: NO).

When the RAID information management unit 3 determines that all of the data stored in the used area have not been recovered (S3: NO), the RAID information management unit 3 performs the restoration processing of the steps S1 and S2 until all of the data stored in the used area have been recovered.

On the other hand, when the RAID information management unit 3 determines that all of the data stored in the used area have been recovered and all of the recovered data have been written to the block areas Block #0, . . . , Block #N of the spare disk SD corresponding to the used area (S3: YES), the RAID information management unit 3 sets a recovery state to "complete" (S4). In other words, the RAID information management unit 3 performs setting to indicate that the physical disk PD can be used. Note that when recovery of the used area is complete, the RAID information management unit 3 may transmit a use possible notification indicating that the faulty physical disk PD can be used to the host apparatus 1.

Hence, the RAID information management unit 3 recovers the used area of the physical disk PD first in a foreground environment. When data recovery in the foreground environment is complete, the RAID information management unit 3 can receive a write command or a read command from an external unit (the host apparatus) relating to the physical disk PD in which used area recovery is complete. Further, the management table 40 continues to manage the associations between the block areas of the used area and the block areas of the spare disk.

Next, the RAID information management unit 3 performs recovery processing on the unused area of the faulty physical disk PD in a background environment.

More specifically, the RAID information management unit 3 determines whether or not the block areas Block #0, . . . , Block #N are unused areas (S5), and when the block areas Block #0, . . . , Block #N are determined to be unused areas (S5: YES), the RAID information management unit 3 generates zero data in each block area Block #0, . . . , Block #N. The RAID information management unit 3 then refers to the management table 40 to transfer the generated zero data to the corresponding block areas Block #0, . . . , Block #N of the spare disk SD such that the generated zero data are gradually written thereto (S6). When the zero data are written to the block areas Block #0, . . . , Block #N of the spare disk SD corresponding to the unused area of the faulty physical disk PD, the block areas Block #0, . . . , Block #N of the spare disk SD are initialized.

The RAID information management unit 3 then transfers the generated zero data to all of the block areas Block #0, . . . , Block #N of the spare disk SD corresponding to the unused area and determines whether or not all of the zero data have been written to the spare disk SD (S7). Note that the RAID information management unit 3 performs the processing of the step S7 even after determining that the block areas Block #0, . . . , Block #N are used areas (S5: NO).

When the RAID information management unit 3 determines that all of the zero data have not been written to the block areas Block #0, . . . , Block #N of the spare disk SD corresponding to the unused area (S7: NO), the RAID information management unit 3 performs the restoration processing of the steps S5 and S6 until all of the zero data have been written to the block areas Block #0, . . . , Block #N of the spare disk SD.

When the RAID information management unit 3 determines that all of the zero data have been written to the block areas Block #0, . . . , Block #N of the spare disk SD corresponding to the unused area (S7: YES), recovery of the unused area is complete, and therefore the RAID information management unit 3 terminates the restoration processing relating to the faulty physical disk PD.

Hence, in this embodiment, when a physical disk PD must be restored, the RAID information management unit 3 recovers the data written in the used area of the physical disk PD first. When recovery of the used area is complete, a data recovery completion notification is transmitted to the external unit so that the external unit can use the physical disk PD, and as a result, the time required for the physical disk PD to become usable by the external unit is shortened.

(3) Restoration Method for Logical Disk LDN

Figure 5:
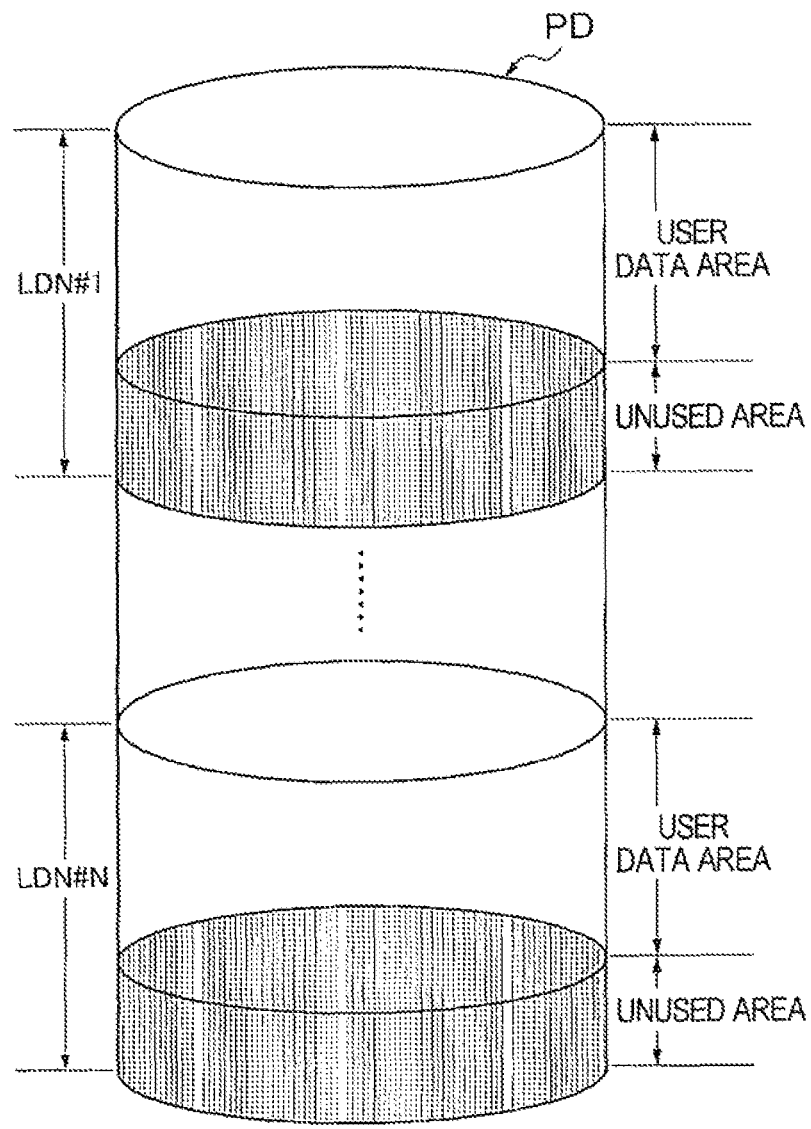
FIG. 5 is a conceptual diagram illustrating a logical disk LDN and a final LBA.

In this embodiment, restoration processing is executed on each block area Block #0, . . . , Block #N of the physical disk PD, but the restoration processing may be executed using a method of managing a final LBA of the used area of the logical disk LDN. FIG. 5 shows a case in which plural logical disks LDN are formed from the storage area of a single physical disk PD. A user data area (used area) and an unused area are formed in each logical disk LDN.

In addition to the management table 40 described above, the used area management unit 4 includes an LBA management table 41 (second management table). The LBA management table 41 is used to manage the usage condition of each sector area of the logical disks LDN, and is constituted by logical disk LDN columns and a column for the physical disks PD corresponding to the logical disks LDN, as shown in FIG. 6. Each cell of the LBA management table 41 is recorded with the LBA of a final sector in which a tail end of the user data written continuously in the logical disk LDN is written.

During restoration processing, the RAID information management unit 3 executes the restoration processing while referring to the LBA management table 41. More specifically, the RAID information management unit 3 reads the final LBA of the user data area and executes the restoration processing on each read area. In comparison with a case where the restoration processing is executed in each block area, as described above, a larger area than a block area can be restored in a single operation, and therefore the time required for the physical disk PD to become usable by an external unit is shortened even further.

The RAID information management unit 3 determines whether to execute the restoration processing in block area Block #0, . . . , Block #N units or to execute the restoration processing in sector area units, which are delimited by a larger storage capacity than the block area Block #0, . . . , Block #N units, in accordance with the capacity of the faulty physical disk PD. Note that the unit of the restoration processing may be determined in accordance with an instruction from the host apparatus 1.

(4) Write Processing During Unused Area Recovery

Figure 7:
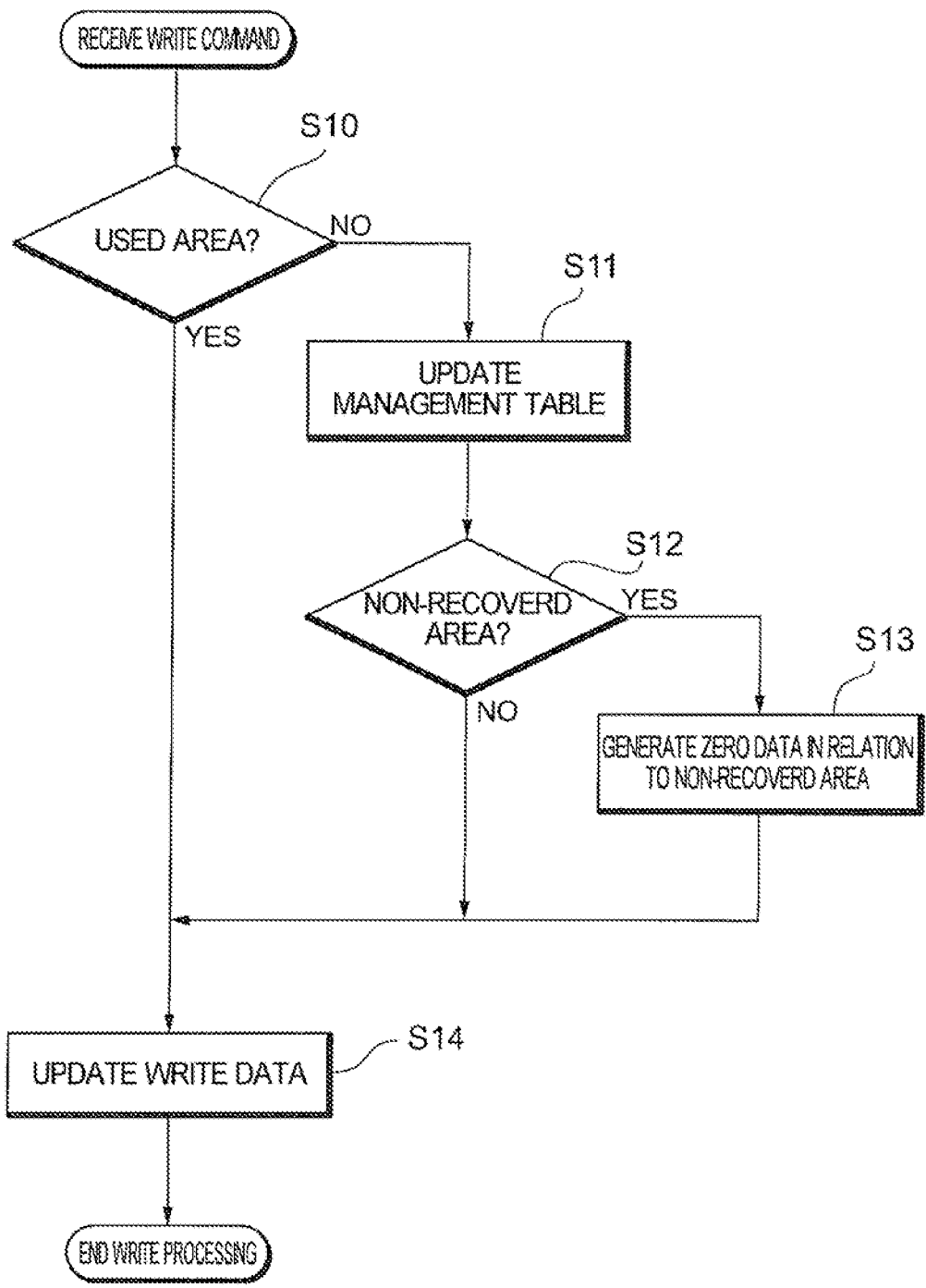
FIG. 7 is a flowchart for performing write processing on the physical disk PD during recovery.

Write processing executed when the RAID information management unit 3 receives a write command relating to a physical disk PD from the host apparatus 1 while the disk array apparatus 2 executes the steps S5 to S7 in a background environment will be described using a flowchart in FIG. 7. A write program for executing this flowchart is stored in the memory (not shown) of the disk array apparatus 2, and when the RAID information management unit 3 receives a write command, the write program is read from the memory and executed.

When the RAID information management unit 3 receives a write command from the host apparatus 1, the RAID information management unit 3 determines whether or not the block area of the physical disk PD serving as the subject of the writing request from the host apparatus 1 is a used area (S10).

Having determined that the host apparatus 1 has requested writing to an unused area of the physical disk PD (S10: NO), the RAID information management unit 3 accesses the used area management unit 4 and updates the management table 40 (S11). More specifically, the RAID information management unit 3 updates the block area Block #0, . . . , Block #N of the physical disk PD in relation to which the host apparatus 1 has requested writing from an unused area to a used area.

After updating the management table 40, the RAID information management unit 3 determines whether or not the block area of the physical disk PD serving as the subject of the writing request from the host apparatus 1 is a non-recovered area (S12).

When the RAID information management unit 3 determines that the block area of the physical disk PD serving as the subject of the writing request from the host apparatus 1 is a non-recovered area (S12: YES), the RAID information management unit 3 generates zero data. The RAID information management unit 3 then refers to the management table 40 to write the generated zero data to a block area Block #0, . . . , Block #N of the spare disk SD corresponding to the non-recovered area (S13).

The RAID information management unit 3 then overwrites (writes) the write data from the host apparatus 1 to the block area Block #0, . . . , Block #N of the spare disk SD in which the zero data were written (S14), and then terminates the write processing.

Note that when the RAID information management unit 3 determines that the host apparatus 1 has requested writing to a used area of the physical disk PD (S10: YES) or to an area that is both unused and recovered (S10: NO, S12: NO), the RAID information management unit 3 writes the write data transmitted from the host apparatus 1 to the block area Block #0, . . . , Block #N of the spare disk SD corresponding to the block area Block #0, . . . , Block #N of the physical disk PD in relation to which writing has been requested, and then terminates the write processing.

(5) Read Processing During Unused Area Recovery

Figure 8:
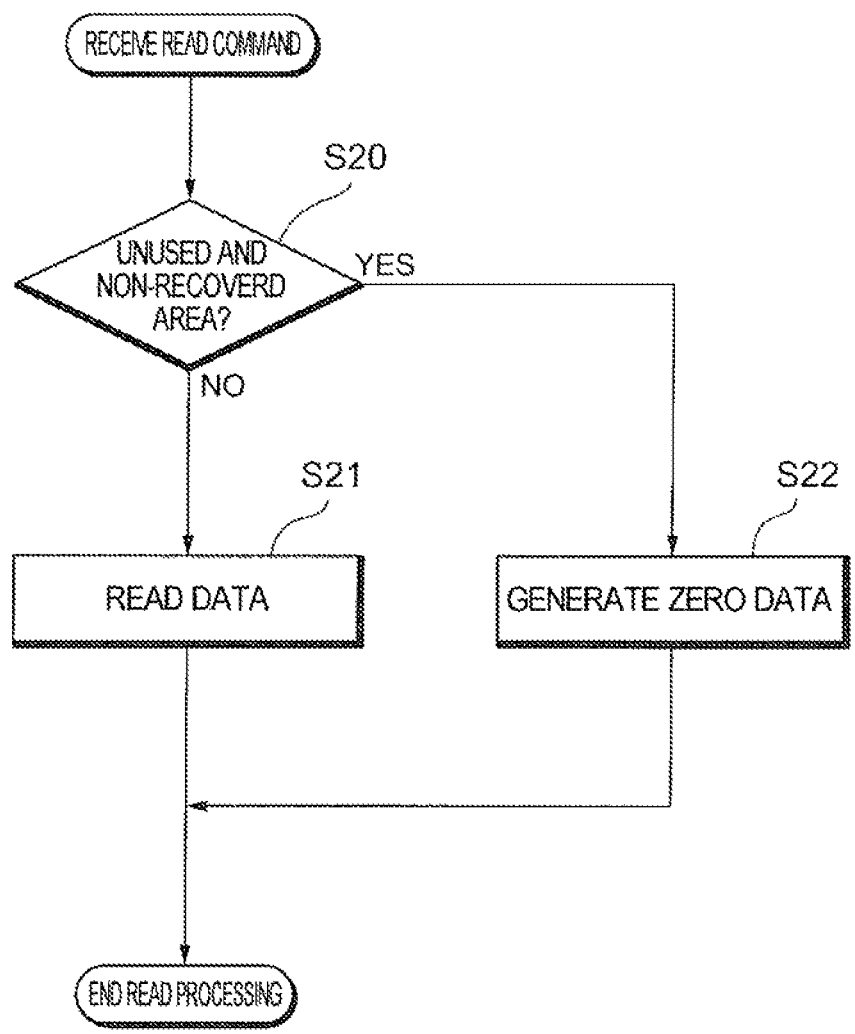
FIG. 8 is a flowchart for performing read processing on the physical disk PD during recovery.

Read processing executed when the RAID information management unit 3 receives a read command relating to a physical disk PD from the host apparatus 1 while the disk array apparatus 2 executes the steps S5 to S7 in a background environment will be described using a flowchart in FIG. 8. A read program for executing this flowchart is stored in the memory (not shown) of the disk array apparatus 2, and when the RAID information management unit 3 receives a read command, the read program is read from the memory and executed.

When the RAID information management unit 3 receives a read command from the host apparatus 1, the RAID information management unit 3 determines whether or not the block area of the physical disk PD serving as the subject of the reading request from the host apparatus 1 is both unused and non-recovered (S20).

When the RAID information management unit 3 determines that the host apparatus 1 has requested reading from a block area of the physical disk PD that is both unused and non-recovered (S20: YES), the RAID information management unit 3 generates zero data, transmits the generated zero data to the host apparatus 1 (S22), and then terminates the read processing.

When the RAID information management unit 3 determines that the block area of the physical disk PD serving as the subject of the reading request from the host apparatus 1 is a used area or an area that is both unused and recovered (S20: NO), on the other hand, the RAID information management unit 3 specifies the read data in relation to which the host apparatus 1 has requested reading from a block area Block #0, . . . , Block #N of the spare disk SD corresponding to the block area Block #0, . . . , Block #N of the physical disk PD serving as the subject of the reading request, reads the specified data, transmits the read data to the host apparatus 1 (S21), issues a completion notification to the host apparatus 1, and then terminates the read processing.

Hence, write processing or read processing can be performed even when the disk array apparatus 2 receives a write command or a read command from the host apparatus 1 while restoring an unused area of a faulty physical disk in a background environment.

The present invention can be applied widely to storage systems having one or more disk array apparatuses.

An exemplary advantage according to the invention is that the used area and the unused area of the faulty physical disk are managed, and therefore recovery of the data stored in the used area of the faulty physical disk can be completed first. As a result, the time required for the physical disk to become usable by an external unit can be shortened and the load of the disk array apparatus can be lightened. Further, in relation to the unused area of the faulty physical disk, zero data can be written to the spare disk in a background environment. Hence, the time required for the physical disk to become usable by an external unit can be shortened, and the faulty physical disk can be restored.

The whole or part of the exemplary embodiments disclosed above can be described as, but not limited to, the following supplementary notes.

(Supplementary note 1) A disk array apparatus, including:
a plurality of physical disks;
at least one spare disk;
a managing unit for managing a usage condition of a plurality of block areas formed by dividing respective storage areas of the physical disks and the spare disk;
a unit for determining, when a fault occurs in a physical disk, whether the block areas of the physical disk are used areas or unused areas on the basis of the usage condition;
a unit for recovering data in relation to block areas determined to be used areas and writing the recovered data to block areas of the spare disk corresponding to the used areas;
a unit for setting that the physical disk is usable when data recovery is completed in relation to all of the block areas determined to be used areas; and
a unit for writing zero data to block areas of the spare disk corresponding to block areas determined to be unused areas after transmitting a notification.

(Supplementary note 2) The disk array apparatus according to Supplementary note 1, further including:
a plurality of logical disks formed by grouping the storage areas or grouping the block areas,
wherein the managing unit manages final addresses of used areas in each logical disk.

(Supplementary note 3) The disk array apparatus according to Supplementary note 1 or 2, further including:

a unit for determining, when a write request relating to the physical disk in which the fault has occurred is received from the host apparatus, whether a writing subject block area is a used area or an unused area on the basis of the usage condition;

a unit for determining, when the writing subject block area is determined to be an unused area, whether the writing subject block area is a recovered area or a non-recovered area;

a unit for writing write data to a block area of the spare disk corresponding to the writing subject block area when the writing subject block area is determined to be a used area or an area that is both unused and recovered; and a unit for writing the write data after writing zero data to the block area of the spare disk corresponding to the writing subject block area when the writing subject block area is determined to be a non-recovered area.

(Supplementary note 4) The disk array apparatus according to any one of Supplementary notes 1 to 3, further including:

a unit for determining, when a read request relating to the physical disk in which the fault has occurred is received from the host apparatus, whether a reading subject block area is a used area or an unused area on the basis of the usage condition;

a unit for determining, when the reading subject block area is determined to be an unused area, whether the reading subject block area is a recovered area or a non-recovered area;

a unit for transmitting to the host apparatus read data read from a block area of the spare disk corresponding to the reading subject block area when the reading subject block area is determined to be a used area or an area that is both unused and recovered; and a unit for transmitting zero data to the host apparatus when the reading subject block area is determined to be a non-recovered area.

(Supplementary note 5) A physical disk restoration method employed in a disk array apparatus having a plurality of physical disks and at least one spare disk, wherein the disk array apparatus executes:

managing a usage condition of a plurality of block areas formed by dividing respective storage areas of the physical disks and the spare disk;

determining, when a fault occurs in a physical disk, whether the block areas of the physical disk are used areas or unused areas on the basis of the usage condition;

recovering data in relation to block areas determined to be used areas and writing the recovered data to block areas of the spare disk corresponding to the used areas;

setting that the physical disk is usable when data recovery is completed in relation to all of the block areas determined to be used areas; and writing zero data to block areas of the spare disk corresponding to block areas determined to be unused areas after transmitting the notification.

(Supplementary note 6) The restoration method according to Supplementary note 5, wherein the disk array apparatus further comprises a plurality of logical disks formed by grouping the storage areas or grouping the block areas, wherein, in the managing step, final addresses of used areas in each logical disk are managed.

(Supplementary note 7) The restoration method according to Supplementary note 5 or 6, wherein the disk array apparatus executes:

determining, when a write request relating to the physical disk in which the fault has occurred is received from the host apparatus, whether a writing subject block area is a used area or an unused area on the basis of the usage condition;

determining, when the writing subject block area is determined to be an unused area, whether the writing subject block area is a recovered area or a non-recovered area;

writing write data to a block area of the spare disk corresponding to the writing subject block area when the writing subject block area is determined to be a used area or an area that is both unused and recovered; and writing the write data after writing zero data to the block area of the spare disk corresponding to the writing subject block area when the writing subject block area is determined to be a non-recovered area.

(Supplementary note 8) The restoration method according to any one of Supplementary notes 5 to 7, wherein the disk array apparatus executes:

determining, when a read request relating to the physical disk in which the fault has occurred is received from the host apparatus, whether a reading subject block area is a used area or an unused area on the basis of the usage condition;

determining, when the reading subject block area is determined to be an unused area, whether the reading subject block area is a recovered area or a non-recovered area;

transmitting read data read from a block area of the spare disk corresponding to the reading subject block area when the reading subject block area is determined to be a used area or an area that is both unused and recovered; and transmitting zero data to the host apparatus when the reading subject block area is determined to be a non-recovered area.

(Supplementary note 9) A disk array apparatus, including:

a plurality of physical disks;

at least one spare disk;

managing means for managing a usage condition of a plurality of block areas formed by dividing respective storage areas of the physical disks and the spare disk;

means for determining, when a fault occurs in a physical disk, whether the block areas of the physical disk are used areas or unused areas on the basis of the usage condition;

means for recovering data in relation to block areas determined to be used areas and writing the recovered data to block areas of the spare disk corresponding to the used areas;

means for setting that the physical disk is usable when data recovery is completed in relation to all of the block areas determined to be used areas; and means for writing zero data to block areas of the spare disk corresponding to block areas determined to be unused areas after transmitting a notification.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A disk array apparatus, comprising:
a plurality of physical disks;
at least one spare disk;
a managing unit for managing a usage condition of a plurality of block areas formed by dividing respective storage areas of the physical disks and the spare disk;
a unit for determining, when a fault occurs in a physical disk of the plurality of physical disks and having a plurality of block areas, whether the block areas of the physical disk are used areas or unused areas on the basis of the usage condition;

a unit for recovering data in relation to the block areas determined to be the used areas and writing the recovered data to a plurality of the block areas of the spare disk corresponding to the used areas;

a unit for setting that the physical disk is usable when data recovery is completed in relation to all of the block areas determined to be the used areas; and a unit for writing zero data to the block areas of the spare disk corresponding to the block areas determined to be the unused areas after setting an indication that the physical disk can be used.

2. The disk array apparatus according to claim 1, further comprising:

a plurality of logical disks formed by grouping the storage areas or grouping the block areas,
wherein the managing unit manages final addresses of the used areas in each logical disk.

3. The disk array apparatus according to claim 1, further comprising:

a unit for determining, when a write request relating to the physical disk in which the fault has occurred is received from the host apparatus, whether a writing subject block area is a used area or an unused area on the basis of the usage condition;

a unit for determining, when the writing the subject block area is determined to be an unused area, whether the writing the subject block area is a recovered area or a non-recovered area;

a unit for writing write data to a block area of the spare disk corresponding to the writing subject block area when the writing subject block area is determined to be the used area or an area that is both unused and recovered; and a unit for writing the write data after writing zero data to the block area of the spare disk corresponding to the writing subject block area when the writing subject block area is determined to be the non-recovered area.

4. The disk array apparatus according to claim 1, further comprising:

a unit for determining, when a read request relating to the physical disk in which the fault has occurred is received from the host apparatus, whether a reading subject block area is a used area or an unused area on the basis of the usage condition;

a unit for determining, when the reading subject block area is determined to be an unused area, whether the reading subject block area is a recovered area or a non-recovered area;

a unit for transmitting to the host apparatus read data read from a block area of the spare disk corresponding to the reading subject block area when the reading subject block area is determined to be the used area or an area that is both unused and recovered; and a unit for transmitting zero data to the host apparatus when the reading subject block area is determined to be the non-recovered area.

5. A physical disk restoration method employed in a disk array apparatus having a plurality of physical disks and at least one spare disk, wherein the disk array apparatus executes:

managing a usage condition of a plurality of block areas formed by dividing respective storage areas of the physical disks and the spare disk;

determining, when a fault occurs in a physical disk of the plurality of disks and having a plurality of block areas, whether the block areas of the physical disk are used areas or unused areas on the basis of the usage condition;

recovering data in relation to the block areas determined to be the used areas and writing the recovered data to a plurality of block areas of the spare disk corresponding to the used areas;

setting that the physical disk is usable when data recovery is completed in relation to all of the block areas determined to be the used areas; and writing zero data to the block areas of the spare disk corresponding to the block areas determined to be the unused areas after setting an indication that the physical disk can be used.

6. The restoration method according to claim 5, wherein the disk array apparatus further comprises a plurality of logical disks formed by grouping the storage areas or grouping the block areas,
wherein, in the managing step, final addresses of the used areas in each logical disk are managed.

7. The restoration method according to claim 5, wherein the disk array apparatus executes:

determining, when a write request relating to the physical disk in which the fault has occurred is received from the host apparatus, whether a writing subject block area is a used area or an unused area on the basis of the usage condition;

determining, when the writing subject block area is determined to be an unused area, whether the writing subject block area is a recovered area or a non-recovered area;

writing write data to a block area of the spare disk corresponding to the writing subject block area when the writing subject block area is determined to be the used area or an area that is both unused and recovered; and writing the write data after writing zero data to the block area of the spare disk corresponding to the writing subject block area when the writing subject block area is determined to be the non-recovered area.

8. The restoration method according to claim 5, wherein the disk array apparatus executes:

determining, when a read request relating to the physical disk in which the fault has occurred is received from the host apparatus, whether a reading subject block area is a used area or an unused area on the basis of the usage condition;

determining, when the reading subject block area is determined to be an unused area, whether the reading subject block area is a recovered area or a non-recovered area;

transmitting read data read from a block area of the spare disk corresponding to the reading subject block area when the reading subject block area is determined to be the used area or an area that is both unused and recovered; and transmitting zero data to the host apparatus when the reading subject block area is determined to be the non-recovered area.

9. A disk array apparatus, comprising:

a plurality of physical disks;

at least one spare disk;

managing means for managing a usage condition of a plurality of block areas formed by dividing respective storage areas of the physical disks and the spare disk;

means for determining, when a fault occurs in a physical disk of the plurality of physical disks and having a plurality of block areas, whether the block areas of the physical disk are used areas or unused areas on the basis of the usage condition;

means for recovering data in relation to the block areas determined to be the used areas and writing the recovered data to a plurality of block areas of the spare disk corresponding to the used areas;

means for setting that the physical disk is usable when data recovery is completed in relation to all of the block areas determined to be the used areas; and means for writing zero data to the block areas of the spare disk corresponding to the block areas determined to be the unused areas after setting an indication that the physical disk can be used.

* * * * *